United States Patent Office 3,365,504
Patented Jan. 23, 1968

3,365,504
VAPOR PHASE PRODUCTION OF PROPARGYL ALCOHOL UNDER ANHYDROUS CONDITIONS
James F. Vitcha, New Providence, and Victor A. Sims, Bayonne, N.J., assignors, by mesne assignments, to Air Reduction Company, Incorporated, New York, N.Y., a corporation of New York
No Drawing. Filed Oct. 22, 1965, Ser. No. 502,411
12 Claims. (Cl. 260—638)

The present invention relates to an improved method for making propargyl alcohol, $HC\equiv CCH_2OH$, by the ethynylation of formaldehyde.

Propargyl alcohol, which has well-known utility in the industrial arts, e.g. as a corrosion inhibitor in acid solutions, was first prepared by Henry by the dehydrohalogenation of 2-bromo allyl alcohol (Henry, Ber: 5, 453, 569, 1872). Subsequently, Reppe discovered a reaction in liquid phase designated as ethynylation, in which acetylene under pressure is reacted with the carbonyl group of an aldehyde or ketone in the presence of catalysts to give compounds in which the ethynyl group ($HC\equiv C-$) is retained. This reaction is described in U.S. patents to Reppe et al. 2,232,867 and 2,300,969, both of which disclose the preparation of a number of acetylenic alcohols and glycols. When, however, the reaction is applied to formaldehyde, the product tends to be mainly butynediol, $HOCH_2C\equiv CCH_2OH$, and even when an effort is made to increase the quantity of propargyl alcohol, there is always produced a substantial quantity of butynediol. Under favorable conditions with copper acetylide, the preferred catalyst, the yield of butynediol may be as high as 92%, with only 5% propargyl alcohol.

It is a principal object of our invention to produce propargyl alcohol by a reaction involving the ethynylation of formaldehyde in which there is substantially no attendant formation of butynediol.

It has been discovered that when the reaction is carried out in the vapor phase, under substantially anhydrous conditions, in the presence of an appropriate ethynylation catalyst, a mole of acetylene will react with a mole of formaldehyde to form propargyl alcohol substantially exclusively, and there is no need for superatmospheric pressures to be employed. The reaction is thus $$HC\equiv CH+CH_2O \rightarrow HC\equiv CCH_2OH$$

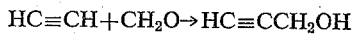

It is a feature of the invention that the ethynylation reaction proceeds substantially exclusively to the production of propargyl alcohol with substantially complete suppression of the formation of butynediol.

It is a further feature of the invention that even when a copper catalyst is employed, the formation of copper acetylide which, when dry, is dangerously explosive, is avoided. Reppe found copper acetylide to be the most suitable catalyst for his ethynylation reaction in the liquid phase.

In addition to the advantages of producing propargyl alcohol substantially exclusively, the vapor-phase method of this invention affords many further advantages, e.g. the method can be continuous, feed ratios of reactants can be easily controlled, and there is no need for the use of high pressure vessels.

Other objects and features of the invention will be apparent as the description proceeds.

As catalysts there are used water-insoluble inorganic copper compounds and we have found particularly effective copper oxide, and copper salts such as copper chromite, copper tungstate, copper molybdate, copper vanadate, and copper alumino-silicate. The copper in all cases is in the cupric form. It is also advantageous to add to the copper compounds minor amounts of the corresponding salts of barium or bismuth or the oxides of these two elements. The catalytic material most suitably is associated with a carrier so as to constitute a bed, or is in a form which itself constitutes a bed. Preferably the bed as used is a fixed bed, but the process can be adapted to a fluid-bed type operation. The choice of the catalyst and of the carrier is of importance. For example, compounds of mercury, nickel, and zinc have been found to be inactive for the formation of propargyl alcohol. In some cases these compounds were reduced by the formaldehyde to the metallic state, and in all cases they gave undesired formaldehyde condensation products, such as methyl formate and methyl alcohol.

The carrier used in the practice of the invention to support the above-identified catalysts to form a bed through which the reactants are passed in vapor form is magnesia or a siliceous carrier, e.g. a silicon oxide or a silicate such as silica, pumice, clays, such as attapulgite, fuller's earth and kaolin, magnesium trisilicate, silicate of alumina and natural and artificial zeolites, such as calcium aluminate silicates, sodium aluminate silicates, and the like. On the other hand, the use of activated charcoal as a carrier has been found to give poorer conversions to propargyl alcohol, as will be seen from the results given below. Also, as will be evident, alumina, when used as a support, give virtually no propargyl alcohol.

In carrying out the process of this invention, it is desirable to have present more than 1 mole of acetylene per mole of formaldehyde, so that the acetylene is always in excess, although a 1:1 mole ratio can be employed, preferably the mole ratio of acetylene to formaldehyde is 1.5:1 to 12:1.

As previously indicated, one of the features of this invention is that the process can be carried out at atmospheric pressure. It will be understood, however, that subatmospheric pressures may be employed, if desired, but ordinarily pressures lower than 300 mm. Hg, or higher than 100 p.s.i.g. serve no useful purpose, and high pressures are generally to be avoided.

The temperature must, of course, be high enough for the reactants to be in vapor form and, generally, the temperatures should be within the range of 100 to 200° C., with temperatures of 150 to 190° C. being preferred. Preferably the acetylene is used in undiluted form but, if desired, the acetylene may be diluted with an inert gas, such as nitrogen. Mixtures of gaseous acetylene and nitrogen containing about 10 to 70% by volume of nitrogen are suitably used.

The space velocity of the reactants through the reaction zone containing the supported catalyst bed, i.e. liters per hour of acetylene and formaldehyde per volume in liters of the catalyst-carrier combination forming the catalyst bed, can vary over relatively wide limits, but it is advantageously 25 to 500 l./hr./l. and preferably 50 to 200 l./hr./l.

With respect to the supported catalyst, it has been found that catalyst concentrations, i.e. percent of catalyst in the catalyst-support combination can vary, but the catalyst concentration is suitably at least 5 percent by weight, preferably 10 to 30 percent by weight, and may be as high as 50 percent by weight. When there is also used an oxide or salt of barium or bismuth the amount of the barium or bismuth compound suitably ranges from 0.5 to 10% by weight of the total supported catalyst. The catalyst is prepared by conventional techniques involving the impregnation, precipitation or coprecipitation of the active components on the carrier from an aqueous solution or a thin paste, followed by drying and roasting to the partially reduced form of the catalyst. Similarly, the carrier can be added in finely ground form to the solution of active components to form a paste which is dried, crushed and heated to form the supported catalyst. The size of the particles of supported catalyst can vary to suit the operational requirements of the particular apparatus being used, but in general the particle size can range from 4 to 30 mesh, but a preferred range is 6 to 12 mesh.

The apparatus employed in carrying out the process of the invention is any convenient equipment adapted to contain a catalyst bed and to permit the passage of acetylene and formaldehyde through the bed, under the conditions described above. The effluent from the reactor is cooled to condense the propargyl alcohol and other liquid products, and the non-condensables consisting primarily of acetylene and some formaldehyde can be separated from the liquid products and recycled to the reaction zone.

The invention will now be described in detail with reference to the following specific embodiments, but it will be understood that the following examples are given for illustrative purposes only and are not intended to be limitative of the invention. In the examples, all parts are by weight unless otherwise indicated.

EXAMPLE 1

*Preparation of catalyst:*

A copper-barium chromite catalyst was precipitated on attapulgite in the following manner: 21 grams barium nitrate was dissolved in 500 ml. of water at 80° C., and to this solution was added 174 grams cupric nitrate trihydrate. A second solution of 101 grams amomnium chromate in 120 ml. of 28% ammonium hydroxide in 500 ml. of water was made, and to this solution was added 400 grams of 100/200 mesh attapulgite to give a paste. The hot nitrate solution was added from a dropping funnel onto the attapulgite paste with stirring to give a golden brown slurry. The slurry was suction-filtered through a steam jacketed funnel, and the semi-dry cake was washed twice with 500 ml. portions of hot water while allowing the catalyst to drain under suction each time. The filter cake was vacuum dried at 80° C. to 140° C. for 12 hours to remove most of the water; the dry brown cake was crushed, and the 6–8 mesh size particles collected. This material contained 6.9% copper and 1.9% barium by analysis; it was then heated several hours in a muffle furnace from 200° C. to 500° C. to a uniform black color. The resulting copper-barium chromite catalyst on attapulgite was then soaked with 10% aqueous acetic acid to remove whatever copper oxide might be present. The solid material was then filtered and washed with water until the yellow extracts were neutral to litmus. The final material was vacuum dried at 150° C. Analysis of the final catalyst indicated a 4.0% copper, and a 2.1% barium content.

Copper barium tungstate and copper vanadate catalysts were also prepared by precipitation techniques essentially similar to the above method. Copper-bismuth oxide catalysts were prepared by soaking the catalyst carriers in strong solutions of copper-bismuth nitrates and then roasting the impregnated carriers to the oxide form. The catalysts referred to below were prepared in an analogous manner.

As previously mentioned, consideration should be given to the proportion of catalyst to carrier. For example, catalyst-carrier combinations containing more than 50% catalyst by weight were found unsuitable for the ethynylation reaction because of the excessive exothermic reaction or exotherm produced with acetylene which resulted in excessive heating of the catalyst, i.e. to temperatures much above 200° C. Such temperatures result in a deactivation of the catalyst. In general, regardless of the type of catalyst used, if a strong exotherm takes place, it results in a poor conversion to propargyl alcohol. However, if the catalyst concentration is kept in the range of 10–30%, the catalyst performs well.

The following examples show the use of various catalysts under various conditions in the ethynylation of formaldehyde to form propargyl alcohol.

The reactor used in these examples consisted of a 25 mm. outside diameter by 24 inches long vertical Pyrex glass tube which contained a coaxially-positioned 5 mm. O.D. thermal well. The catalyst bed was formed of 100 ml. of 6–8 mesh particles supported by a layer of 6 mm. glass beads on the bottom, and covered by a similar layer of glass beads on the top. These beads aided in preheating and premixing the reaction gases. The reactor tube was heated by means of an electric furnace consisting of insulated nichrome wire wound onto a glass tube. In all runs the bed was first pretreated with acetylene highly diluted with nitrogen, then saturated with acetylene, which had the effect of increasing its activity.

In operation, the vapor mixture of formaldehyde and acetylene passed from the preheated tube downwardly through the heated catalyst bed. The products were cooled by means of a water condenser and were collected in a receiver and two traps kept at −50° C. The non-condensibles were measured by a wet test meter. The liquid products were analyzed for propargyl alcohol and formaldehyde to determine the conversion and yield of propargyl alcohol based on formaldehyde. The liquid product collected was distilled in the 32° to 140° C. range with essentially no high boilers or resinous materials remaining in the still pot. The propargyl alcohol was identified by physical properties, analysis for acetylenic hydrogen and infrared spectrum.

The results of various runs using copper-barium chro-

TABLE I

| Ex. No. | Catalyst System | Av. Bed Temp., °C. | Mole Ratio $C_2H_2/CH_2O$ | Space Velocity, l./hr./l. | Percent $CH_2O$ Conv. to Propargyl Alcohol in one pass |
|---|---|---|---|---|---|
| 2 | 25% Copper Chromite, 3% Ba Chromite on Pumice. | 130 | 6.5 | 100 | 21 |
| 3 | do | 150 | 2.2 | 105 | 23 |
| 4 | do | 150 | 1.9 | 85 | 24 |
| 5 | 15% Copper Chromite, 2% Ba Chromite on Attapulgite. | 140 | 5.5 | 80 | 21 |
| 6 | do | 150 | 4.6 | 80 | 25 |
| 7 | do | 150 | 3.0 | 70 | 20 |
| 8 | do | 135 | 2.0 | 65 | 10 |
| 9 | 12% Copper Chromite, 2% Ba Chromite on Attapulgite. | 120 | 10.7 | 80 | 22 |
| 10 | 20% Copper Chromite, 3% Ba Chromite on Attapulgite. | 180 | 3.4 | 130 | 32 |
| 11 | do | 150 | ca. 10 | *ca. 120 | 10 |
| 12 | do | 175 | ca. 6 | *ca. 80 | 13 |
| 13 | 15% Copper Chromite, 3% Ba Chromite on Magnesia. | 140 | 2.5 | 80 | 14 |
| 14 | do | 150 | 3.6 | 100 | 17 |
| 15 | do | 160 | 2.9 | 130 | 25 |
| 16 | 25% Copper Chromite, 4% Ba Chromite on Kaolin. | 145 | 3.7 | 85 | 25 |

*100 p.s.i.g. pressure.

mite catalysts on different supports at atmospheric pressure (unless otherwise indicated) are given in Table I above.

The use of increased pressure was found not to be necessary. Examples 11 and 12 were made at 100 p.s.i.g., showing that there was nothing to be gained by the use of superatmospheric pressures for the reactant gases.

The catalyst had good physical properties with respect to abrasion and appearance, did not give extreme exotherms with acetylene and did not form copper acetylide with acetylene, as indicated by the lack of red coloration and by analysis. The spent catalysts was found to be regenerative by heating under vacuum or in a muffle furnace.

The following table shows results with copper catalysts other than chromite:

TABLE II

| Ex. No. | Catalyst System | Av. Bed Temp., °C. | Mole Ratio $C_2H_2/CH_2O$ | Space Velocity, l./hr./l. | Percent $CH_2O$ Conv. to Propargyl Alcohol in one pass |
|---|---|---|---|---|---|
| 17 | 18% Copper Tungstate 2% Barium Tungstate on Pumice. | 160 | 4.1 | 80 | 21 |
| 18 | 25% Copper Tungstate 4% Barium Tunstate on Attapulgite. | 140 | 4.0 | 75 | 13 |
| 19 | 20% Copper Metavanadate on Kaolin | 120 | 1.6 | 80 | 7 |
| 20 | 15% Copper Oxide 6% Bismuth Oxide on Pumice. | 130 | 1.9 | 75 | 8 |
| 21 | 20% Copper Oxide 6% Bismuth Oxide on Kaolin | 145 | 3.5 | 85 | 7 |
| 22 | 30% Copper Oxide 10% Bismuth Oxide on Magnesium tri-Silicate. | 140 | 2.7 | 100 | 11 |
| 23 | ___do___ | 160 | 5.0 | 70 | 20 |
| 24 | Copper Alumino-Silicate* | 145 | 4.3 | 80 | 11 |

*Formed from "Decalso" (a sodium alumino-silicate ion-exchange resin) by elution with cupric nitrate.

In all of the examples, the products were completely or essentially free of butynediol, and the unreacted formaldehyde and acetylene are in a form which can be easily recovered and reused.

It will be apparent to those skilled in the art that various changes and modifications may be made in the embodiments described above without departing from the invention, as defined in the appended claims. It is intended, therefore, that all matter contained in the foregoing description shall be interpreted as illustrative only and not as limitative of the invention.

We claim:

1. A method of making propargyl alcohol which comprises reacting a molar excess of acetylene with formaldehyde in the vapor phase and under substantially anhydrous conditions in the presence of a siliceous catalyst bed comprising an insoluble inorganic cupric compound selected from the group consisting of copper oxide, copper chromite, copper tungstate, copper molybdate, copper vanadate, and copper alumino-silicate.

2. A method of making propargyl alcohol as defined in claim 1, wherein said catalyst bed consists essentially of an insoluble inorganic cupric compound associated with a siliceous carrier.

3. A method of making propargyl alcohol as defined in claim 2, wherein said cupric compound is present in the amount of 5 to 50% by weight of the cupric compound-carrier combination.

4. A process as defined in claim 1, wherein said cupric compound is in the presence of a minor amount of an oxide or corresponding salt of barium or bismuth.

5. A process as defined in claim 1, wherein said cupric compound is present in the amount of 5 to 50% by weight of the cupric compound-carrier combination.

6. A method of making propargyl alcohol as defined in claim 1, wherein the acetylene to formaldehyde molar ratio is 1.5:1 to 12:1.

7. A method of making propargyl alcohol as defined in claim 1, wherein the reaction is carried out at a temperature of 100 to 200° C.

8. A method of making propargyl alcohol as defined in claim 4, wherein the acetylene to formaldehyde molar ratio is 1.5:1 to 12:1.

9. A method of making propargyl alcohol as defined in claim 4, wherein the reaction is carried out at a temperature of 100 to 200° C.

10. A method of making propargyl alcohol as defined in claim 5, wherein the acetylene to formaldehyde molar ratio is 1.5:1 to 12:1.

11. A method of making propargyl alcohol as defined in claim 5, wherein the reaction is carried out at a temperature of 100 to 200° C.

12. A method as defined in claim 1, wherein said cupric compound is copper chromite.

References Cited

UNITED STATES PATENTS 2,232,867   2/1941   Reppe et al. _____ 260—638

BERNARD HELFIN, *Acting Primary Examiner.*

J. E. EVANS, *Assistant Examiner.*